United States Patent
Hallundbæk

(10) Patent No.: US 9,509,190 B2
(45) Date of Patent: Nov. 29, 2016

(54) DOWNHOLE ELONGATED ELECTRICAL MOTOR

(75) Inventor: Jørgen Hallundbæk, Græsted (DK)

(73) Assignee: WELLTEC A/S, Allerød (DK)

( * ) Notice: Subject to any disclaimer, the term of this patent is extended or adjusted under 35 U.S.C. 154(b) by 136 days.

(21) Appl. No.: 14/114,432

(22) PCT Filed: Apr. 27, 2012

(86) PCT No.: PCT/EP2012/057801
§ 371 (c)(1),
(2), (4) Date: Oct. 28, 2013

(87) PCT Pub. No.: WO2012/146731
PCT Pub. Date: Nov. 1, 2012

(65) Prior Publication Data
US 2014/0054993 A1 Feb. 27, 2014

(30) Foreign Application Priority Data

Apr. 29, 2011 (EP) .................................. 11164297

(51) Int. Cl.
*H02K 5/132* (2006.01)
*H02K 5/16* (2006.01)
(Continued)

(52) U.S. Cl.
CPC ................ *H02K 5/173* (2013.01); *E21B 4/04* (2013.01); *H02K 5/132* (2013.01); *H02K 5/1732* (2013.01); *H02K 7/003* (2013.01); *H02K 7/083* (2013.01); *H02K 16/00* (2013.01)

(58) Field of Classification Search
CPC ............... H02K 5/1285; H02K 5/132; H02K 5/00–5/26
USPC ..................................................... 310/87, 90
See application file for complete search history.

(56) References Cited

U.S. PATENT DOCUMENTS 2,718,193 A * 9/1955 Zimsky ..................... 417/423.12
3,671,786 A 6/1972 Jones
4,309,062 A * 1/1982 Bischoff .............. H02K 5/1672
384/205

(Continued)

FOREIGN PATENT DOCUMENTS

EP 0 490 845 A1 6/1992
EP 0 872 943 A1 10/1998
(Continued)

OTHER PUBLICATIONS

International Preliminary Report on Patentability issued in International Patent Application No. PCT/EP2012/057801 dated Oct. 29, 2013.
(Continued)

*Primary Examiner* — Thomas Truong
(74) *Attorney, Agent, or Firm* — Nixon & Vanderhye P.C.

(57) ABSTRACT

The present invention relates to a downhole electrical motor elongated in a longitudinal direction, comprising a housing, a stator comprised inside the housing, a rotor comprised inside the stator rotatably connected to the stator, wherein the rotor has a locked end and a non-locked end and is locked in the locked end to avoid movement of the rotor in the longitudinal direction, and the rotor is able to move along the longitudinal direction in the non-locked end of the rotor to avoid thrust loads on the rotor due to thermal expansion of the rotor during rotor heating when the electrical motor is in operation and further comprising a locked bearing connected to the stator for supporting the rotor in the locked end and a non-locked bearing connected to the stator for supporting the rotor in the non-locked end, wherein the bearings are at least partially made from a ceramic material. Furthermore, the invention relates to a downhole tool comprising an electrical motor according to the invention and to a downhole system comprising a plurality of electrical motors according to the invention.

12 Claims, 3 Drawing Sheets

(51) Int. Cl.
*H02K 7/08* (2006.01)
*H02K 5/173* (2006.01)
*H02K 7/00* (2006.01)
*E21B 4/04* (2006.01)
*H02K 16/00* (2006.01)

(56) References Cited

U.S. PATENT DOCUMENTS

| | | | |
|---|---|---|---|
| 5,052,828 | A | 10/1991 | Ciokajlo et al. |
| 5,559,383 | A | 9/1996 | Ide |
| 6,388,353 | B1* | 5/2002 | Liu et al. ............ 310/156.09 |
| 2002/0079763 | A1 | 6/2002 | Fleshman et al. |
| 2006/0239845 | A1* | 10/2006 | Yamamoto et al. ..... 417/423.12 |
| 2007/0017672 | A1 | 1/2007 | Kayadarma |
| 2009/0058221 | A1* | 3/2009 | Liu .................. E21B 43/128 310/260 |
| 2011/0037332 | A1 | 2/2011 | Neuroth et al. |

FOREIGN PATENT DOCUMENTS

| | | |
|---|---|---|
| GB | 501 323 | 2/1939 |
| RU | 2 338 094 C2 | 11/2008 |
| RU | 93 898 U1 | 5/2010 |
| WO | WO 01/52279 A1 | 7/2001 |
| WO | WO 2004/027211 A1 | 4/2004 |
| WO | WO 2004/114498 A2 | 12/2004 |

OTHER PUBLICATIONS

International Search Report for PCT/EP2012/057801, mailed Aug. 23, 2012.
Written Opinion of the International Search Report for PCT/EP2012/057801, mailed Aug. 23, 2012.

* cited by examiner

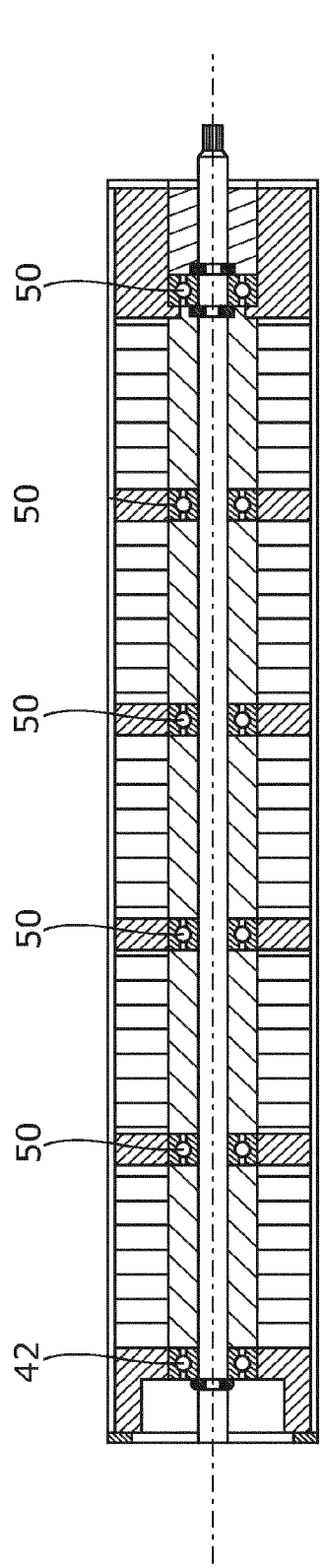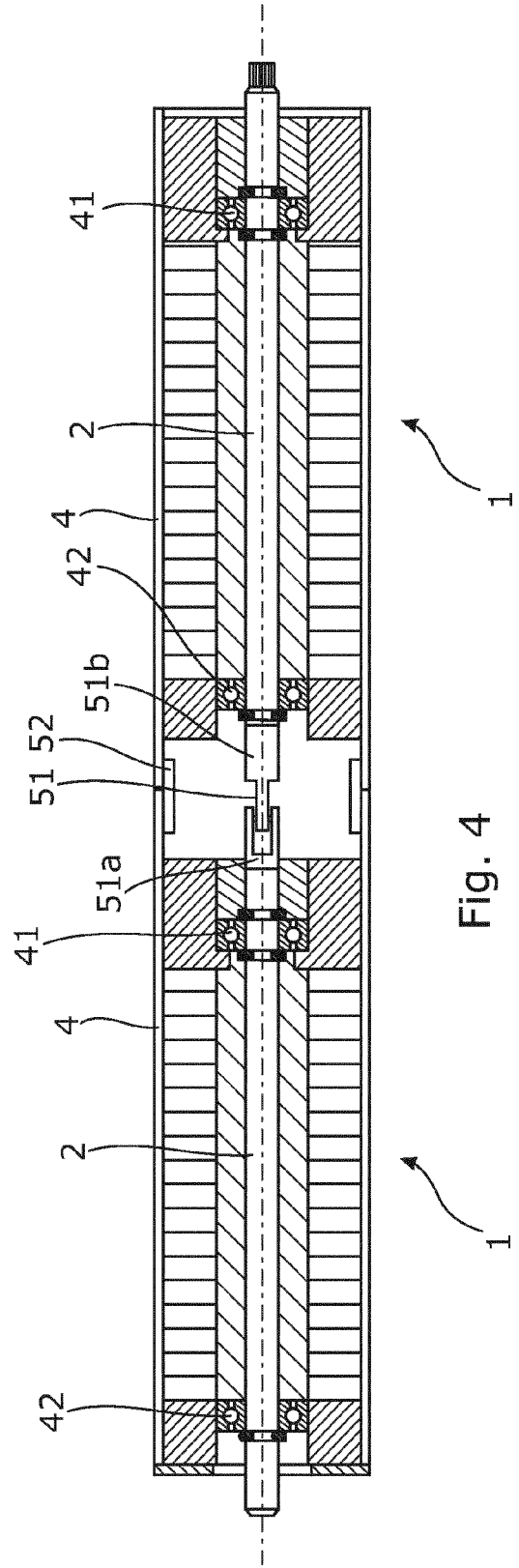

DOWNHOLE ELONGATED ELECTRICAL MOTOR

This application is the U.S. national phase of International Application No. PCT/EP2012/057801, filed 27 Apr. 2012, which designated the U.S. and claims priority to EP Application No. 11164297.1, filed 29 Apr. 2011, the entire contents of each of which are hereby incorporated by reference.

FIELD OF THE INVENTION

The present invention relates to a long electrical motor for use in a downhole tool. Furthermore, the invention relates to a downhole tool comprising an electrical motor according to the invention and to a downhole system comprising a plurality of electrical motors according to the invention.

BACKGROUND ART

The present invention relates to electric motors and more particularly, the present invention relates to electric motors especially suited for use in the borehole drilling art. Motors of this type must be such as to meet the special space requirements of a borehole, so that the outside diameter is generally very limited, whereas such motors may be very long. The precise length depends on the desired power of the motor. Further to the special space requirements during operations in a downhole environment, this type of environment also represents challenging conditions such as high pressure, high temperature and an acidic environment.

One difficulty encountered in motors of this type is that the rotor shaft must be tightly supported by at least bearings in each end of the motor, and typically also bearings in intermediate positions to ensure that the rotation of the rotor is progressing without wobbling, which would induce increased tear of the electrical motor and decreased power output. Therefore, a very tight fit of the rotor within the stator is essential in the design of an efficient electrical motor. Thermally induced thrust loads on the rotor present a challenge to the design of such electrical motors, primarily since, due to thermal expansion of the rotor, the rotor may bend towards the stator resulting in increased friction and a wobbling motion of the rotor.

Prior efforts to circumvent this problem have been made, such as U.S. Pat. No. 3,136,905 disclosing a hollow rotor for allowing cooling water inside the rotor, thereby avoiding large thermal expansions of the rotor. By using this approach, another problem is introduced in the design, as it becomes important to provide a good seal on a rotating member, which is a difficult task under normal up-hole operating conditions as it is, but is considerably more complicated when working downhole with increased temperatures and increased pressure differences.

Therefore, a need exists for providing an improved electrical motor with the ability to maintain a tight fit of the rotor inside the stator and maintain the tight fit during thermal expansions during downhole operations.

SUMMARY OF THE INVENTION

It is an object of the present invention to wholly or partly overcome the above disadvantages and drawbacks of the prior art. More specifically, it is an object to provide an improved electrical motor capable of operating in elevated ambient temperatures without the use of complicated cooling systems.

The above objects together with numerous other objects, advantages, and features, which will become evident from the below description, are accomplished by a solution in accordance with the present invention by a downhole electrical motor elongated in a longitudinal direction, comprising:
 a housing,
 a stator comprised inside the housing, and
 a rotor comprised inside the stator rotatably connected to the stator,
wherein the rotor has a locked end and a non-locked end and is locked in the locked end to avoid movement of the rotor in the longitudinal direction, and the rotor is able to move along the longitudinal direction in the non-locked end of the rotor to avoid thrust loads on the rotor due to thermal expansion of the rotor during rotor heating when the electrical motor is in operation and further comprising a locked bearing connected to the stator for supporting the rotor in the locked end and a non-locked bearing connected to the stator for supporting the rotor in the non-locked end, wherein the bearings are at least partially made from a ceramic material.

Also, the present invention relates to a downhole electrical motor elongated in a longitudinal direction, comprising:
 a housing,
 a stator comprised inside the housing, and
 a rotor comprised inside the stator rotatably connected to the stator,
wherein the rotor has a locked end and a non-locked end and is locked in the locked end to avoid movement of the rotor along the longitudinal direction, and the rotor is able to move along the longitudinal direction in the non-locked end of the rotor to avoid thrust loads on the rotor due to thermal expansion of the rotor during rotor heating when the electrical motor is in operation.

Locked and non-locked refers to the ability to move in a longitudinal direction, i.e. a locked end cannot move in the longitudinal direction and a non-locked end may move in a longitudinal direction of the tool.

Also, a downhole electrical motor according to the invention may comprise a locked bearing connected to the stator for supporting the rotor in the locked end.

Further, a downhole electrical motor according to the invention may comprise a non-locked bearing connected to the stator for supporting the rotor in the non-locked end.

Locked and non-locked bearings refer to the ability of the bearing to move in a longitudinal direction of the tool, i.e. a locked bearing cannot move in the longitudinal direction and a non-locked bearing may move in a longitudinal direction of the tool.

Additionally, a downhole electrical motor according to the invention may comprise at least an additional bearing arranged between the locked and the non-locked bearings.

The bearings may be roller bearings, such as ball bearings, cylindrical roller bearings, needle roller bearings, tapered roller bearings or spherical bearings.

Also, the roller bearing may comprise a roller element, such as a ball, cylinder, needle, tapered or spherical element made from a ceramic material.

Moreover, the bearings may comprise a race element made from a ceramic material.

In one embodiment, the bearings may be ball bearings.

In another embodiment, the ball bearings may comprise balls made from a ceramic material.

Furthermore, a downhole electrical motor according to the invention may comprise snap rings or circlips for locking the locked end of the rotor to avoid movement of the rotor in the longitudinal direction.

In one embodiment, the rotor may comprise a shaft member, a rotor member, and the shaft member and rotor member may be interlocked by a tongue and a groove joint, the groove joint being elongated in the longitudinal direction of the motor interacting with the tongue allowing movement of the shaft member in relation to the rotor member in the longitudinal direction of the motor.

Moreover, the present invention relates to a downhole tool comprising an electrical motor according to the invention.

Finally, the invention relates to a downhole system comprising a plurality of electrical motors as described above, wherein the electrical motors may be coupled by extendable coupling means.

BRIEF DESCRIPTION OF THE DRAWINGS

The invention and its many advantages will be described in detail below with reference to the accompanying schematic drawings, which for the purpose of illustration show some non-limiting embodiments and in which FIG. 3 is a schematic diagram of an electrical motor comprising a plurality of intermediate bearings, and FIG. 4 is a schematic diagram of two serially coupled electrical motors.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
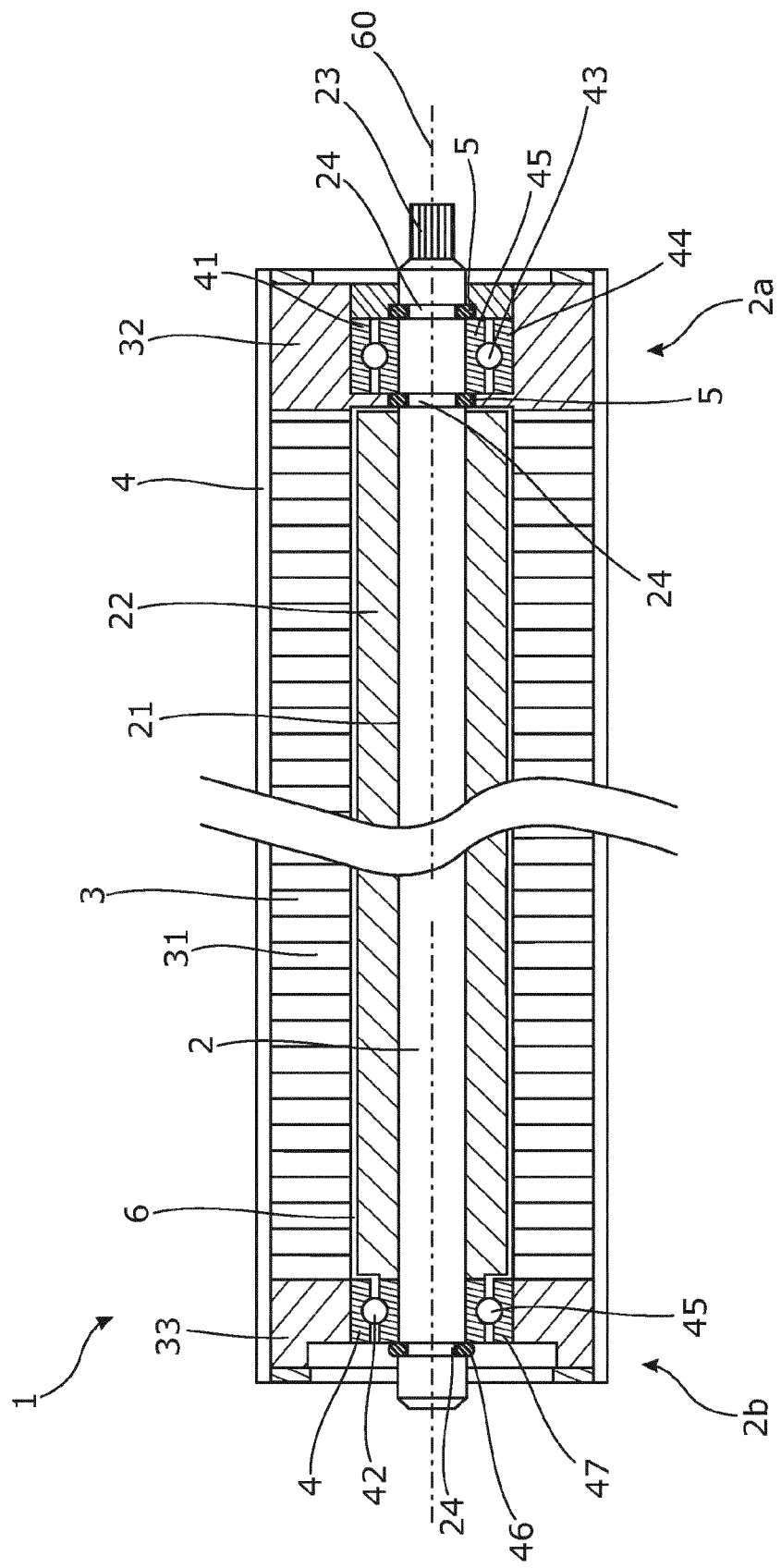
FIG. 1 shows a schematic diagram of an electrical motor.

FIG. 1 shows an electrical motor 1 elongated in a longitudinal direction 60 for providing a rotational force downhole for driving units such as a hydraulic pump. The electrical motor comprises a rotor 2 and a stator 3 contained in a motor housing 4. The stator 3 is fixedly connected to the motor housing 4, and the stator 3 comprises a stator member 31, a locking end member 32 and a non-locking end member 33. The rotor 2 comprises a shaft member 21, a rotor member 22, force transmitting means 23 and locking grooves 24. Furthermore, the rotor 2 has a locked end 2a and a non-locked end 2b. The rotor 2 is rotatably connected to the stator 3 by a plurality of bearings 41, 42 such as at least two bearings, i.e. a locked bearing 41 supporting the rotor 2 in the locked end 2a, and a non-locked bearing 42 supporting the rotor 2 in the non-locked end 2b. The terms locked and non-locked refer to the ability to move in the longitudinal direction 60 of the electrical motor 1, and therefore the locked bearing 41 is not able to move in the longitudinal direction 60, whereas the non-locked bearing 42 is able to move in the longitudinal direction 60 of the electrical motor 1. The locked bearing 41 is a ball bearing comprising a ball 45 and furthermore comprising a locked inner racer 43, a locked outer racer 44 and a plurality of bearing balls 45 arranged between the locked inner racer 43 and the locked outer racer 44. The non-locked bearing 42 is a ball bearing comprising a ball 45 and furthermore comprising a non-locked inner racer 46, a non-locked outer racer 47 and a plurality of bearing balls 45. The locked outer racer 44 is fixedly connected to the locking end member 32, and the locked inner racer 43 is fixedly connected to the shaft member 21 of the rotor 2 by means of two locking rings 5 engaging locking grooves 24 in the shaft member 21 on both sides of the inner racer 43 for locking the longitudinal movement of the rotor 2 in the locked end. The non-locked outer racer 47 abuts the non-locking end member 33 of the stator 3, thereby confining the movement of the non-locked outer racer 47 in a radial direction of the electrical motor 1 but not confining the movement of the non-locked outer racer 47 in the longitudinal direction 60 of the electrical motor 1. The non-locked inner racer 46 is fixed to the shaft member 21 of the rotor 2 by means of a locking ring 5 engaging a locking groove 24 in the shaft member 21 on a side of the inner non-locked inner racer 46 opposite to the rotor member 22, thereby allowing longitudinal movement of the rotor 2 due to thermal expansion of the rotor 2.

The locking and non-locking end members 32, 33 may advantageously be produced by spark eroding, spark cutting, burning and similar techniques where a very thin cut may be made in a very thick material by removing material with a spark. This enables the user to produce the locking and non-locking end members 32, 33 in their entire thickness which optimises the heat transfer and rigidity of the motor. Alternatively, the locking and non-locking end members 32, 33 are produced more conventionally by techniques such as punching a sheet of metal and then building the locking and non-locking end members 32, 33 by a plurality of such sheets.

Several different types of losses lead to heating in an electrical motor. The main source of heating typically originates from electrical heating of the current leading windings in the motor, which is also commonly referred to as copper losses due to the fact that the windings in an electrical motor are typically made from copper wire. Sometimes the copper losses are subdivided into primary and secondary losses, referring to primary losses in the rotor windings and secondary losses in the stator windings. Further losses in the electrical motor may occur due to dissipation of magnetic energies in the stator and other types of less significance in terms of size, stray losses stemming from leakages, generation of harmonic energies, etc. Also, mechanical losses such as frictional losses in the bearings may lead to heating in the electrical motor. The problems arising as a consequence of heating in an electrical motor become increasingly important when working in a downhole environment. Heat generating equipment in downhole equipment faces the problem of elevated ambient temperatures, temperatures, which, in deep wells, may exceed several hundred degrees. The elevated ambient temperature combined with equipment, which, due to spacial restrictions and pressure differences in the borehole, typically has a very "tight" construction, lead to big challenges in expelling heat from the equipment. Therefore, solutions to circumvent problems with heating have great technical as well as commercial value in the design of downhole equipment.

During operation of the electrical motor 1, the rotor 2 rotates with respect to the stator 3, and heat is generated primarily in the rotor 2. Therefore, the rotor 2 is the part of the electrical motor experiencing the highest temperature during operation. The stator 3 and motor housing 4 also increase in temperature as heat dissipates from the rotor 2 towards the surroundings of the electrical motor 1. The rotor 2 only has solid-solid connections with the surroundings through the bearings 41, 42 to avoid frictional losses, and therefore the temperature gradient is very large between rotor and stator. Furthermore, given the fact that typical bearing balls of the bearings 41, 42 are made from materials of relatively low thermal conductance such as stainless steel types, the heat transmission through the bearings is very low. Other types of bearing balls with higher thermal conductivity such as more conventional chrome steel balls may also be utilised. An intervening space 6 between the stator 3 and the rotor 2 is filled with oil to avoid ingress of borehole fluid into the motor 1. Oil is also a relatively poor thermal conductor and the temperature gradient through the oil in the intervening space 6 is therefore also very high. To sum up, the rotor 2 has difficulties in expelling the heat generated during operation.

When the rotor 2 heats up during operation, the dimensions of the rotor will increase as a consequence of thermal expansion. Due to the elongated nature of the electrical motor 1, which stems from the spacial restrictions of working in a borehole, the thermal expansion is, in particular, a problem in the elongated direction. Since electrical motors may be up to several meters long while only few centimeters wide, the thermal expansion in the elongate direction may result in significant changes in the length of the rotor 2. Conventionally, problems of thermal expansion have been dealt with by actively or passively cooling the rotor 2 to avoid large temperature gradients between the stator 3 and the rotor 2. The problem is that since the stator 3 and rotor 2 are conventionally coupled in both ends, a large thermal expansion of the rotor 2 simultaneous to a smaller thermal expansion of the stator 3 and motor housing 4 results in a thrust load on the rotor 2 causing the rotor 2 to deflect. This type of deflection may cause a wobbling motion during rotation of the rotor 2, which may reduce the efficiency of the electrical motor 1, and, in the worst-case scenario, destroy the electrical motor 1.

The bearings 41, 42, 50 may preferably be roller bearings, such as ball bearings, cylindrical roller bearings, needle roller bearings, tapered roller bearings or spherical bearings. And the bearings may at least partially be made from a ceramic material to provide a bearing with improved durability and performance during elevated working temperatures. The roller element 45 such as a ball, cylinder, needle, tapered or spherical element may be made from a ceramic material. Also, the race elements 43, 44, 46, 47 may be made from ceramic material to improve the performance of the bearings.

The locking rings 5 locking the bearings 41, 42 may advantageously be a snap ring 5 or circlips 5 engaging the locking grooves 24.

In the electrical motor shown in FIG. 1, the rotor 2 may, during operation, thermally expand towards the non-locked bearing 42 without deflecting. The non-locked bearing 42 abuts the non-locking end member 33 and is therefore confined in the radial direction, but the non-locked bearing 42 may move in the longitudinal direction 60, thereby being capable of compensating for the thermal expansion of the rotor again, thus avoiding deflection of the rotor 2.

Figure 2:
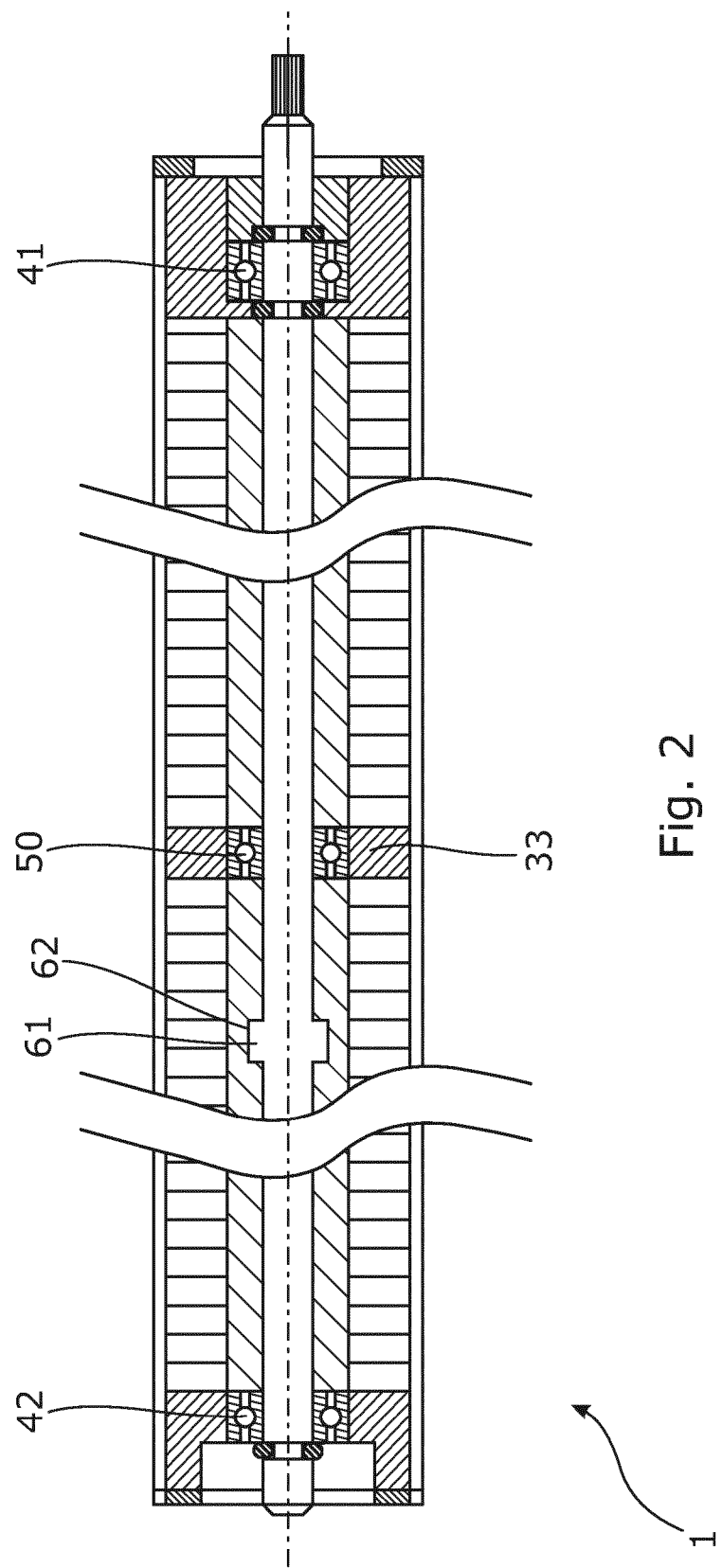
FIG. 2 is a schematic diagram of an electrical motor comprising an intermediate bearing.

FIG. 2 shows another electrical motor 1 further comprising an intermediate non-locked bearing 50 in an intermediate position between the non-locked bearing 42 and the locked bearing 41. The purpose of arranging the intermediate non-locked bearing 50 between the non-locked bearing 42 and the locked bearing 41 is to increase stability of the rotor 2, especially if the rotor 2 is very long. It is essential that intermediate bearings 50 must be non-locked so that parts of the rotor 2 may be locked while other parts are not. If the intermediate bearing 50 is non-locked, the rotor 2 is free to expand throughout the entire length of the rotor 2. Adding an intermediate non-locked bearing 50 halfway between the non-locked bearing 42 and the locked bearing 41 will reduce by half a length of the rotor unsupported by bearings. As shown in FIG. 3, a plurality of intermediate non-locked bearings 50 may be introduced in case of very long motors or in case of high requirements of stability of the rotor 2.

FIG. 4 shows two coupled electrical motors 1 connected in series. Each motor 1 comprises a non-locked bearing 42 and a locked bearing 41 suspending a rotor shaft 21, thereby allowing each of the rotor shafts 21 to move freely according to the invention. The shafts 21 are coupled between the motors 1 by means of extendable coupling means 51. The extendable coupling means 51 comprises a locked coupling end 51a and a non-locked coupling end 51b, due to the fact that the extendable coupling means 51 couples two shafts 21 between a locked bearing 41 and non-locked bearing 42. Therefore, the extendable coupling means 51 must have at least two capabilities, namely to be able to transfer the rotational force from one shaft 21 to another and to accommodate the length change of the shaft 21 coupled to the non-locked coupling end 51b by being extendable. One embodiment of extendable coupling means 51 having these two capabilities is an extendable universal joint, but even simpler extendable coupling means having at least the capability of transferring rotation and accommodating a length change, such as simple tongue and groove joints, may be used. The electrical motor housings 4 in FIG. 4 have been coupled by motor housing connection means 52.

The rotor comprises a shaft member 21 and a rotor member 22. The shaft member 21 and rotor member 22 may be interlocked by a tongue 61 and groove joint 62 as shown in FIG. 2. The groove joint 62 is elongated in the longitudinal direction 60 of the motor 1 interacting with the tongue 61 allowing movement of the shaft member 21 in relation to the rotor member 22 in the longitudinal direction 60 of the motor 1. The groove joint 62 may be arranged in the rotor member 22 and the tongue 61 in the shaft member 21 or vice versa.

The bearing balls 45 are preferably made from a highly endurable material such as a ceramic material or a high grade steel. The bearing ball material is preferably very hard, endurable, and resistant to high temperatures and can be manufactured with great dimensional precision and low tolerances. The entire bearing 41, 42 including bearing balls 45 and racers 43, 44, 46, 47 may be made from the same material, or alternatively the so-called hybrid bearings may be utilised combining e.g. ceramic bearing balls 45 with steel racers 44. The choice of material allows the user to improve characteristics of the electrical motor 1 such as to decrease friction in the bearings 41, 42, to increase the lifetime of the bearings 41, 42 or to increase the heat transfer through the bearings 41, 42 from the rotor 2 towards the stator 3 and motor housing 4.

Although the invention has been described in the above in connection with preferred embodiments of the invention, it will be evident for a person skilled in the art that several modifications are conceivable without departing from the invention as defined by the following claims.

The invention claimed is:

1. A downhole electrical motor configured to operate in a downhole well environment, comprising:
   a housing sized and configured to be placed in and complementary to a shape of the downhole well environment, the housing having a length in an axial dimension and a diameter in a radial dimension, the length being greater than the diameter such that the housing is elongated in a longitudinal direction;
   a stator arranged inside the housing,
   a rotor arranged inside the stator and rotatably connected to the stator, the rotor arranged about a shaft;

wherein:
the rotor has a locked end and a non-locked end;
the rotor is locked in the locked end to avoid movement of the rotor in the longitudinal direction;
the rotor is able to move along the longitudinal direction at the non-locked end of the rotor to avoid thrust loads on the rotor due to thermal expansion of the rotor during rotor heating when the electrical motor is in operation;
a locked bearing is connected to the stator for supporting the rotor in the locked end and a non-locked bearing is connected to the rotor for supporting the rotor in the non-locked end, in relation to the stator, wherein the non-locked bearing is supported on a non-locking end member of the stator, and wherein the bearings are at least partially made from a ceramic material;
the shaft is arranged to project from the housing at the locked end; and
a portion of the shaft projecting from the housing at the locked end comprises a first force transmitting connection configured to allow the shaft to transmit its force to another shaft or another member driven by the motor during operation.

2. The downhole electrical motor according to claim 1, further comprising at least an additional non-locked bearing arranged between the locked bearing and the non-locked bearing.

3. The downhole electrical motor according to claim 1, wherein the bearings are roller bearings, as the roller bearings being ball bearings, cylindrical roller bearings, needle roller bearings, tapered roller bearings, or a spherical bearings.

4. The downhole electrical motor according to claim 3, wherein the roller bearing comprises a roller element, the roller element being a ball, cylinder, needle, tapered or spherical element made from a ceramic material.

5. The downhole electrical motor according to claim 1, wherein the bearings comprise a race element made from a ceramic material.

6. The downhole electrical motor according to claim 1, further comprising snap rings or circlips for locking the locked end of the rotor to avoid movement of the rotor along the longitudinal direction.

7. The downhole electrical motor according to claim 1, wherein the shaft and the rotor are interlocked by a tongue and a groove joint, the groove joint being elongated in the longitudinal direction of the motor interacting with the tongue allowing movement of the shaft in relation to the rotor in the longitudinal direction of the motor.

8. A downhole tool comprising the electrical motor according to claim 1.

9. A downhole system comprising a plurality of electrical motors according to claim 1, wherein the electrical motors are coupled by an extendable coupler.

10. The downhole electrical motor according to claim 1, wherein the locked end of the shaft within the housing comprises a first locking groove and a second locking groove arranged along the shaft and spaced apart such that in operation the locked bearing is arranged between and adjacent the first and second locking grooves.

11. The downhole electrical motor according to claim 10, wherein the first and second locking grooves comprise first and second locking rings, the first locking ring being configured to engage the first locking groove and the second locking ring being configured to engage the second locking groove, and an arrangement of the first and second locking rings being engaged with the first and second locking grooves is configured to prevent the locked bearing from moving in the longitudinal direction.

12. The downhole electrical motor according to claim 1, wherein:
the shaft is arranged to project from the housing at the non-locked end; and
a portion of the shaft projects from the housing at the non-locked end and comprises a second force transmitting connection configured to interface with a locked end of a second downhole electrical motor in series.

* * * * *